Patented June 17, 1952

2,600,690

UNITED STATES PATENT OFFICE 2,600,690

SULFUR COLORS OF THE DIOXAZINE SERIES AND METHOD OF PREPARING THE SAME

Gordon Bradbury Robbins, Claymont, Del., assignor to E. I. du Pont de Nemours and Company, Wilmington, Del., a corporation of Delaware No Drawing. Application April 7, 1950, Serial No. 154,736

7 Claims. (Cl. 260—246)

This invention relates to novel colors of the dioxazine series.

It is an object of this invention to produce novel, sulfide vattable colors of the triphendioxazine series, characterized by dyeing cotton in violet shades of good fastness properties, good brilliance and high tinctorial power. A further object is to provide sulfur dyes of the aforementioned class which can be used to dye cotton yarn in packages or beams, with the production of level dyeings. Additional important objects and advantages of this invention will appear as the description proceeds.

It is known that sulfur dyes are relatively scarce in those portions of the spectrum ranging from orange, through red, to violet. On the other hand, sulfur dyes generally possess the advantages of being easily reducible, hence easily applicable to textile material, and of yielding furthermore, dyeings of good fastness qualities. Furthermore, many sulfur dyes of the prior art contain material which does not completely dissolve in the vat and is filtered out on the surface of the package or beam, resulting in uneven strength and troublesome contamination of the fiber.

Now, according to this invention, sulfide vattable colors of the aforementioned desirable, valuable properties are obtained by introducing sulfide-vattable groups into the terminal phenyl rings of a 6,13-dihalogeno-2,9-di(3'-alkoxyphenyl)-triphendioxazine, whereby compounds of the following formula are obtained:

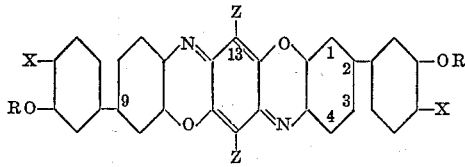

wherein Z stands for chlorine or bromine, R for methyl or ethyl, and X represents a sulfide vattable group, such as the thiocyano radical, an alkyl-xanthate radical or a disulfide radical which is shared with another dioxazine molecule of the same structure.

To prepare these compounds, I preferably start with the corresponding bis 4'-amine, that is a compound of the general formula

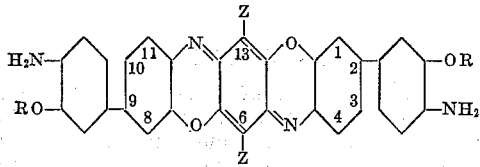

wherein Z and R have the same significance as above. These in turn may be prepared by hydrolyzing the corresponding bis acylamino compounds, for instance 6,13-dihalogeno-2,9-di(3'-alkoxy-4'-benzoylaminophenyl)-triphendioxazine. The bis primary amine is tetrazotized in customary manner, and then reacted with an aqueous solution of an alkali-metal-thiocyanate, an alkali-metal xanthate or an alkali-metal disulfide to replace each diazonium chloride group by one of the aforementioned sulfide-vattable groups, respectively.

An alternate method of preparing the —S—S— derivatives is to treat those dyes of the invention in which X is SCN or

with aqueous sodium sulfide, thus forming first the mercapto derivative (leuco solution) and then oxidizing, for example by blowing a stream of air through the solution. This results in the precipitation of the dye molecule in the di-sulfide form, which may be filtered, washed and dried.

The novel products are insoluble in water but soluble in the customary sodium sulfide vat (containing $Na_2S$ and $Na_2CO_3$) to produce a greenish yellow vat which dyes cotton and penetrates readily into the inner layers of a beam or yarn package. When the dyed material is exposed to an oxidizing bath, for instance sodium dichromate and acetic acid, a bright, violet color, of excellent fastness properties is developed.

Without limiting my invention the following examples are given to illustrate my preferred mode of operation. Parts mentioned are by weight.

EXAMPLE 1

Part A.—Synthesis

One hundred parts of 6,13-dichloro-2,9-di(3'-methoxy-4'-benzoylamino-phenyl)-triphendioxazine (prepared by condensing 2 moles of dianisidine with 1 mole of chloranil, isolating the dry product and treating it in nitrobenzene suspension with an excess of benzoyl chloride; see for instance U. S. P. 2,092,387, Example 13), are heated for 12 hours in 1600 parts of 71.5% sulfuric acid at 140° to 150° C. to hydrolyze off the benzoyl groups. The resulting mixture is drowned in 4000 parts of water, filtered, washed free of acid, and suspended in 2500 parts of water. Aqueous ammonia is then added until the mixture is alkaline to phenolphthalein. After agitating for ½ hour, the slurry is filtered and washed with water until the cake is neutral. There is obtained a filter cake analyzing 25% to 35% solids, and equivalent to 62.4 parts of 6,13-dichloro-2,9-di(3'-methoxy-4'-amino-phenyl)-triphendioxazine.

The above filter cake is stirred to a smooth slurry in 1600 parts water and milled. 83 parts of 37% hydrochloric acid are then added, and the mixture is cooled to 0° C. A solution of 27.7 parts of sodium nitrite in 65 parts of water is then cautiously run in, keeping the slurry cooled to 0° to 5° C. during the addition and for 15 minutes afterward. Then there is added slowly a solution of 32.6 parts of sodium thiocyanate in 130 parts of water. The mixture is agitated for 5 minutes in the cold, then warmed during 15 minutes to 50° C., during which period nitrogen is evolved. The mixture is held at 50° to 55° C. for ½ hour, then filtered, washed with water until the cake is free from acid and dried. The color thus obtained is believed to have the formula

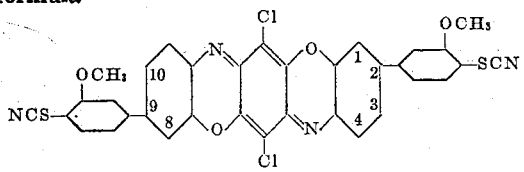

and may be named 6,13-dichloro-2,9-di(3'-methoxy - 4' - thiocyano - phenyl)-triphendioxazine.

*Part B.—Application*

A dye bath is made up at 82° C. containing 0.5 part of the above dye, 10 parts of sodium sulfide, 2 parts of sodium carbonate and 30 parts of salt in 2500 parts of water. The dye dissolves in the bath giving a clear, olive-green vat. When 100 parts of cotton yarn are treated in the vat for 45 minutes, a greenish-yellow color shows on the skein until it has been squeezed, rinsed and oxidized in a bath containing 2 parts of sodium dichromate and 4 parts of acetic acid in 2000 parts of warm water, whereupon the skein develops a full, bright shade of violet.

When cotton yarn in the form of a package is dyed in the Franklin machine with a vat prepared as described above and developed with sodium dichromate and acetic acid solution, there is obtained a bright violet dyeing of very good levelness.

EXAMPLE 2

The tetrazonium compound prepared from 100 parts of 6,13-dichloro-2,9-di(3'-methoxy-4'-amino-phenyl)-triphendioxazine as described in Example 1, in the form of a slurry at 0 to 5° C. is added during 15 to 25 minutes to a solution, maintained at 60° to 65° C. containing 67.2 parts potassium-ethyl-xanthate and 52.5 parts soda ash in 420 parts of water. Nitrogen gas is evolved during the addition. The mixture is then held at 60° to 65° C. for 20 minutes longer and filtered. The cake is washed with water until free from water-soluble material, then dried. There are obtained 100 parts of the dye having the probable structure

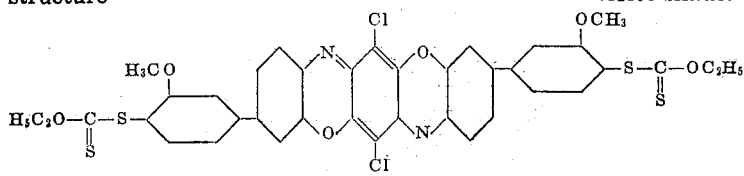

This product dyes cotton in the same way as the product of Example 1, giving a vat of the same appearance and a dyeing of the same shade.

EXAMPLE 3

The tetrazonium compound prepared from 100 parts of 6,13-dichloro-2,9-di(3'-methoxy-4'-amino-phenyl)-triphendioxazine as described in Example 1, in the form of a slurry at 0 to 5° C., is added during 15 to 25 minutes to a solution, maintained at 60° to 65° C., containing 89 parts of sodium disulfide and 52.5 parts soda ash in 500 parts water. Nitrogen is evolved. The mixture is then held at 60° to 65° C. for 20 minutes longer and filtered. The cake is washed with water until free from water-soluble material, then dried. There are obtained 96 parts of a dye having the probable structure

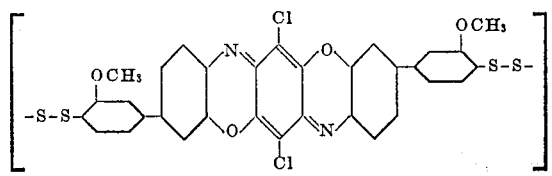

wherein the free valences of the disulfide radicals shown are attached to other molecules of the same structure.

This product dyes cotton in the same way as the product of Example 1, and gives identical shades and brightness.

EXAMPLE 4

One hundred fifteen parts of 6,13-dibromo-2,9-di(3'-methoxy - 4' - benzoylamino-phenyl)-triphendioxazine is heated for 12 hours in 1600 parts of 72% sulfuric acid at 140° to 150° C., then drowned in 4000 parts of water, filtered and washed with water until the cake is free from sulfuric acid. The filter cake is extracted with aqueous ammonia by the procedure described in Example 1, giving a filter cake of 25 to 35% solids content, equivalent to 73.0 parts of 6,13-dibromo-2,9-di(3'-methoxy - 4' - amino-phenyl)-triphendioxazine.

The above filter cake is milled in water, tetrazotized and treated with sodium thiocyanate by the same procedure as described in Example 1, using the same conditions and the same amounts of hydrochloric acid, sodium nitrite and sodium thiocyanate as were used there. There are obtained 102 parts of dye having the probable structure.

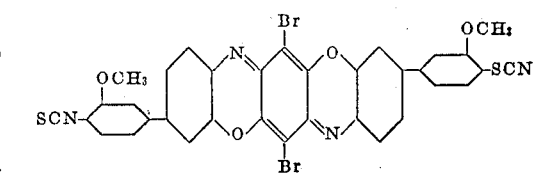

Its chemical name, accordingly, is 6,13-dibromo-2,9-di(3'-methoxy-4'-thiocyano-phenyl)-triphendioxazine. When cotton is dyed and developed with this product in the manner described in Example 1, there is obtained a blue-violet shade.

EXAMPLE 5

One hundred parts of 6,13-dichloro-2,9-di(3'-ethoxy-4'-benzoyl-amino-phenyl) - triphendioxazine, prepared in a manner analogous to that used for the corresponding dimethoxy compound in Example 1 above, is hydrolyzed in 71.5% sulfuric acid by the method described in Example 1 to give a filter cake equivalent to 60.8 parts of 6,13-dichloro - 2,9 - di(3'-ethoxy-4'-amino-phenyl) -triphendioxazine.

The above filter cake is stirred to a smooth slurry in 1600 parts of water and milled. 83 parts of 73% hydrochloric acid are then added, and the mixture is cooled to 0° C. A solution of 26.5 parts of sodium nitrite in 65 parts of water is then cautiously run in, keeping the slurry at 0° to 5° C. during the addition and for 15 minutes afterward. Then there is added slowly a solution of 30.8 parts of sodium thiocyanate in 125 parts of water. The mixture is agitated for 5 minutes at 0° C. to 10° C., then warmed during 15 to 20 minutes to 50° C. and held at 50° to 55° C. for ½ hour. The product is filtered and washed with water until free from acid and dried. There are obtained 98 parts of a dye having the probable structure

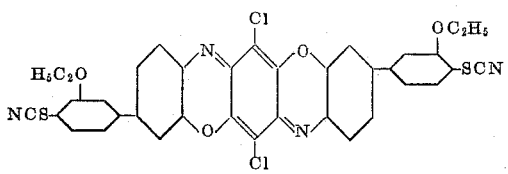

This product, which may be named 6,13-dichloro-2,9-di(3'-ethoxy - 4' - thiocyano-phenyl)-triphendioxazine, dyes cotton yarn by the procedure described in Example 1 to give a full shade of violet.

It will be clear that the above examples are merely illustrative, and that the details thereof may be varied within the skill of those engaged in this art.

For instance, in lieu of running solutions of the mineral acid and nitrite successively into an aqueous slurry of the diamine, the diazotization may be done by adding the nitrite to the slurry of the diamino compound, then running this mixture into cooled aqueous mineral acid.

It is important to have the diamino compound in fine particles for tetrazotization. The preferred method for accomplishing this is to mill a suspension of the diamino compound in water in a colloid mill such as the Manton-Gaulin mill or the Follow and Bates mill or in a ball mill. This can be done before addition of mineral acid, or, if the milling equipment is acid-resistant, the milling may be done in the presence of mineral acid.

The best temperature for the replacement reaction (wherein the diazonium groups are split off) is between about 40° C. and about 70° C., but temperatures above this range are not harmful. The proportion of the replacement reagent is not critical. Quantities from about 1.1 to about 1.3 times the calculated amounts usually are used, although larger or smaller proportions may be employed.

The products of this invention have the advantage of providing violet sulfur dyes of excellent tinctorial strength and brilliance as well as of very good general fastness properties. Their brilliance is due to their high purity by virtue of the method employed for preparing them. In addition they have excellent solubility in the vat, enabling uniform dyeings upon the package dyeing machine, as already pointed out.

I claim as my invention:

1. Sulfur dyestuffs of the dioxazine series characterized by the general formula

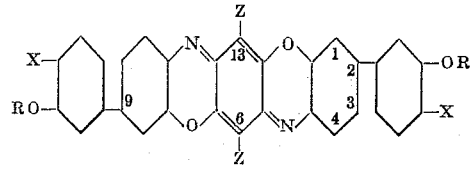

wherein Z is halogen selected from the group consisting of chlorine and bromine, R is an alkyl radical of not more than 2 carbon atoms, while X represents a sulfide-vattable radical from the group consisting of the thiocyanate, alkyl xanthate and disulfide radicals.

2. 6,13 - dichloro - 2,9 - di(3'-methoxy-4'-thiocyano-phenyl)-triphendioxazine, the same being a sulfide-vattable dyestuff, dyeing cotton in a violet shade.

3. A process of producing a dioxazine-sulfur dyestuff which comprises tetrazotizing a dioxazine compound of the general formula

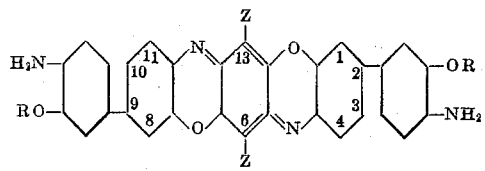

wherein Z is halogen selected from the group consisting of chlorine and bromine, and R is an alkyl radical of not more than 2 carbon atoms, and reacting upon the resulting tetrazonium compound with an aqueous solution of a reagent selected from the group consisting of alkali-metal thiocyanates, alkali-metal alkyl-xanthates and alkali-metal disulfides, whereby to replace the diazonium halide groups by sulfide-vattable radicals of the aforementioned group.

4. The sulfide-vattable dioxazine dyestuff corresponding to the formula:

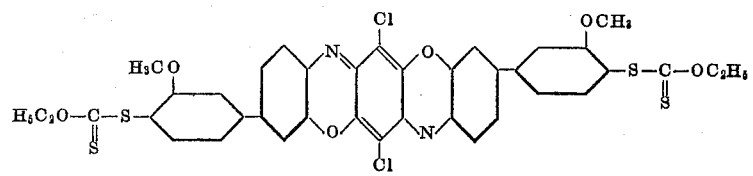

5. The sulfide-vattable dioxazine dyestuff corresponding to the formula:

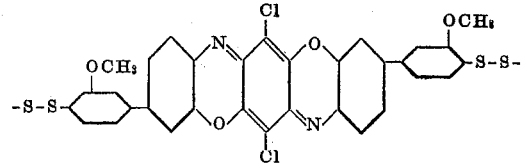

wherein the free valences of the disulfide radicals shown are attached to other molecules of the same structure.

6. 6,13-dibromo - 2,9 - di(3'-methoxy-4'-thiocyanophenyl)-triphendioxazine, the same being a sulfide-vattable dyestuff, dyeing cotton in a blue-violet shade.

7. 6,13 - dichloro - 2,9 - di(3'-ethoxy-4'-thiocyanophenyl)-triphendioxazine, the same being a sulfide-vattable dyestuff, dyeing cotton in a violet shade.

GORDON BRADBURY ROBBINS.

No references cited.